United States Patent [19]

Loyd

[11] Patent Number: 4,829,157

[45] Date of Patent: May 9, 1989

[54] ELECTRIC IRON FOR HEATING HEAT-SENSITIVE TAPE

[76] Inventor: Larry M. Loyd, 4126 W. Poinsettia Dr., Phoenix, Ariz. 85029

[21] Appl. No.: 56,149

[22] Filed: Jun. 1, 1987

[51] Int. Cl.$^4$ .......................... H05B 3/00; H05B 1/02
[52] U.S. Cl. .................................. 219/228; 156/579; 219/240; 219/245; 219/241
[58] Field of Search ................. 219/245–259, 219/240, 243, 230, 228, 227; 38/74, 75, 82, 93; 156/577, 579, 574; 223/52.6, 52.5

[56] References Cited

U.S. PATENT DOCUMENTS

| | | | |
|---|---|---|---|
| 572,467 | 12/1896 | Baker | 219/254 |
| 915,070 | 3/1909 | Bowerwax | 219/228 X |
| 1,471,823 | 10/1923 | Boswell | 219/258 |
| 1,507,807 | 9/1924 | Beeson | 219/228 X |
| 2,299,322 | 10/1942 | Harter | 219/228 X |
| 2,553,274 | 5/1951 | Pohl | 38/93 UX |
| 3,906,186 | 9/1975 | Szolis | 219/243 X |
| 4,029,935 | 6/1977 | Archer et al. | 219/240 X |
| 4,160,688 | 7/1979 | Brooks et al. | 156/579 |
| 4,227,067 | 10/1980 | McElroy | 219/228 X |
| 4,248,659 | 2/1981 | Bopst | 219/245 X |

FOREIGN PATENT DOCUMENTS 42517 11/1924 Norway .............. 223/52.6

Primary Examiner—Anthony Bartis
Attorney, Agent, or Firm—Gregory J. Nelson

[57] ABSTRACT

An electric iron for heating and releasing the adhesive of a bonding tape used to join fiberglass panels for insulating heating and air conditioning ducts includes a generally S-shaped resistance heating element disposed in a recess on the upper side of a planar sole plate of the iron. A body section is secured over the upper side of the sole plate and covers a layer of refractory material contiguously covering the sole plate and heating element to prevent heat dissipation upwardly therefrom. Additional thermal insulation in the form of planar gaskets and layer of spun fibrous material is provided above the refractory layer and the body section is vented by openings through the walls thereof. The heating element is thermostatically controlled and is protected by a high temperature limit fuse as well as an excess current fuse. The sole plate may be made V-shaped so as to engage inside or outside corners formed by abutting panels being joined. The iron is manipulated by a handle secured to the top of the body section. The handle may be elongated and secured to the body section by a universal joint thereby permitting adjustment of the handle position to accommodate use of the tool in hard-to-reach locations.

6 Claims, 2 Drawing Sheets

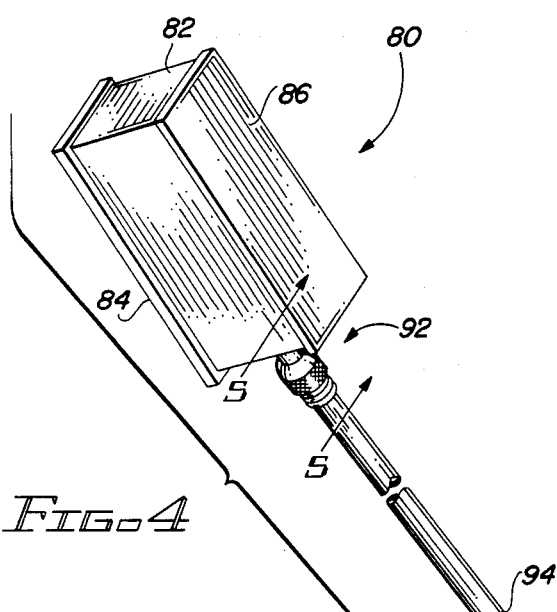
FIG.4
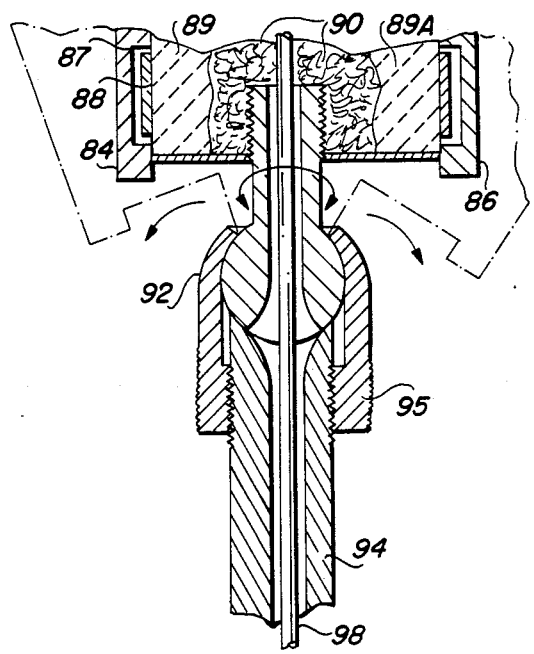
FIG.5
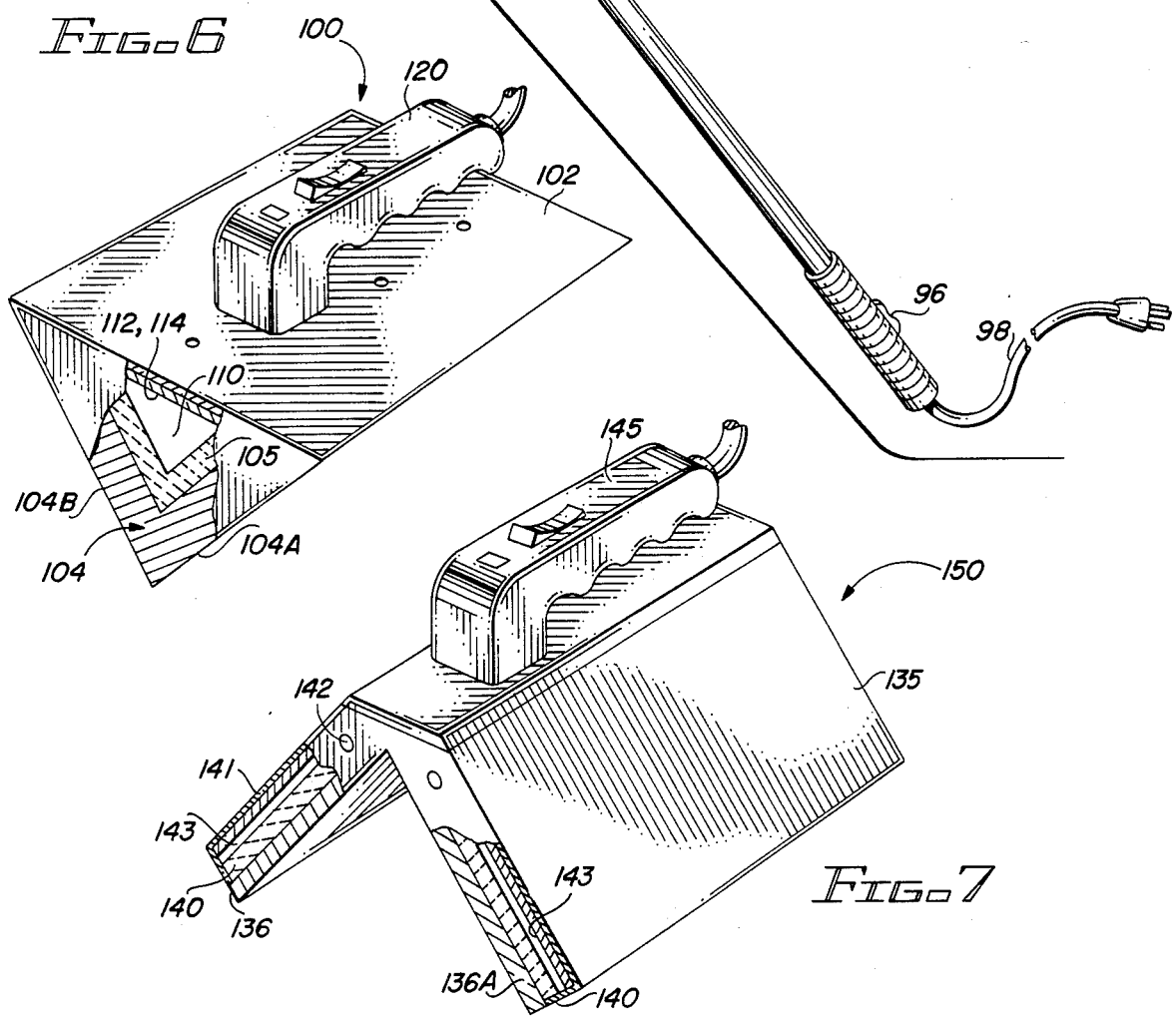
FIG.6
FIG.7

ELECTRIC IRON FOR HEATING HEAT-SENSITIVE TAPE

This invention relates to an electric iron and more particularly relates to an electric iron of the type for heating a heat-sensitive tape of the type used for joining sections of fiberglass panels such as those used to insulate heating and air conditioning ducts.

Traditionally heating and air conditioning ducts have been manufactured from sheet metal and these components are joined at interlocking mechanical seams or are connected by soldering techniques. Ducts for this purpose are insulated with materials such as fiberglass which have the advantages of being relatively light weight, are generally weather and moisture proof and provide inherent insulative qualities. The joining or assembly of the panels is accomplished by aligning and abutting adjacent panel sections and securing the panel sections together with a special heat-sensitive adhesive tape which, when heated to an elevated temperature, will bond to the panels. One brand of this type of tape that is widely used is "Therm-Lock" tape which is manufactured and sold by Johns-Mansville Corporation.

The heating of heat sensitive tape is accomplished by various heating devices and often electric irons are used for this purpose. One type of iron that is used for heating heat-sensitive adhesive tape used in joining fiberglass components is the type of iron which is used for seaming carpets. A carpet seaming iron of this type is generally described in U.S. Pat. No. 3,927,928. This iron, which is specially adapted for carpet applications, has a body and an electrially heated sole plate. The body of the iron is provided with a structure having longitudinal guiding ridges which are configured to force and bend the carpet to provide the operator with better visibility as the carpet seaming operation proceeds.

While irons of this general design are applicable for use with adhesive materials used for bonding fiberglass sections, such irons have certain deficiencies. Conventional irons or carpet seaming irons are not capable of producing the substantially higher temperatures which are desirable in the fiberglass bonding operation. Their construction is such that the elevated temperatures are not obtainable and if obtainable would result in an iron which is unsafe to operate. For example, the tape sold under the tradmark "Therm-Lock" requires temperatures in the range of 580° F. to heat the tape and release the embedded adhesive.

Further, since prior art irons are generally adapted for other purposes, as for example carpet seaming, their shape and configuration does not lend itself to the particular requirements of the application of fiberglass insulation panels. Often in securing these panels to air conditioning and heating ducts, various situations are encountered where space is tight or limited or where the panels are joined at intersecting angles which do not allow the use and insertion of conventional irons.

Accordingly, there exists a need for an electric iron which would be suitable for use with the bonding tape of the type normally used to adhesively join fiberglass components and fiberglass board insulation panels. Accordingly, the primary object of the present invention is to provide an iron adapted to heat bonding tape of the type normally used to adhesively join fiberglass components and fiberglass board insulation panels.

Another object of the invention is to provide such an iron having a body and a sole plate with the body adequately insulated and a sole plate containing a heating coil which will allow the iron to reach temperatures in the range exceeding 580° F.

Another object of the present invention is to provide such an iron in which the electrical circuit includes a high limit switch which will shut the iron off if temperatures exceed a certain limit, as for example 700° F., and which circuit further includes a fuse which will prevent shock if the cord is inadvertently burned or cut by the user.

Another object of the present invention is to provide an iron adapted for use with fiberglass bonding tape having a configuration to allow the user to apply the heated surface of the iron to areas of limited working space and to corners.

Briefly, the above objects are accomplished by the present invention which has a heating element, such as a nickel cadmium heating coil, embedded in a heating sole plate. The sole plate is recessed to receive the element. The sole plate is mounted to a body which includes an intermediate which is above the sole plate. The intermediate member has an outer casing of aluminum and a hollow core which is filled with a suitable refractory material which serves to retain heat at the sole plate so that it does not dissipate away from the material being heated. The upper portion of the body, is of aluminum or similar material and supports a heat-resistant handle. The upper portion of the body also contains a suitable insulation material. The electrical circuit includes appropriate fusing to prevent shock to the user if the cord is cut or burned and also thermostatic control to terminate electrical current in the event temperatures beyond a predtermined maximum limit are reached.

In an alternate embodiment of the invention, the sole plate is formed in a V-configuration so the electrical heating iron of the present invention may be conveniently used at corners or at other interesting joints. In another embodiment, the electrical iron is carried on an elongate handle with dual heating plates on opposite sides of the iron for use in restricted areas or for use in areas that are hard to reach.

The above and other objects and advantages of the present invention will become more apparent from the following description, claims and drawings in which:

FIG. 4 is a perspective view of an alternate embodiment of the present invention;

FIG. 5 is a sectional view taken along lines 5—5 of FIG. 4;

FIG. 6 is a perspective view of still another alternate embodiment of the present invention partly broken away; and FIG. 7 is also a perspective view of an alternate embodiment of the present invention partly broken away.

Figure 1:
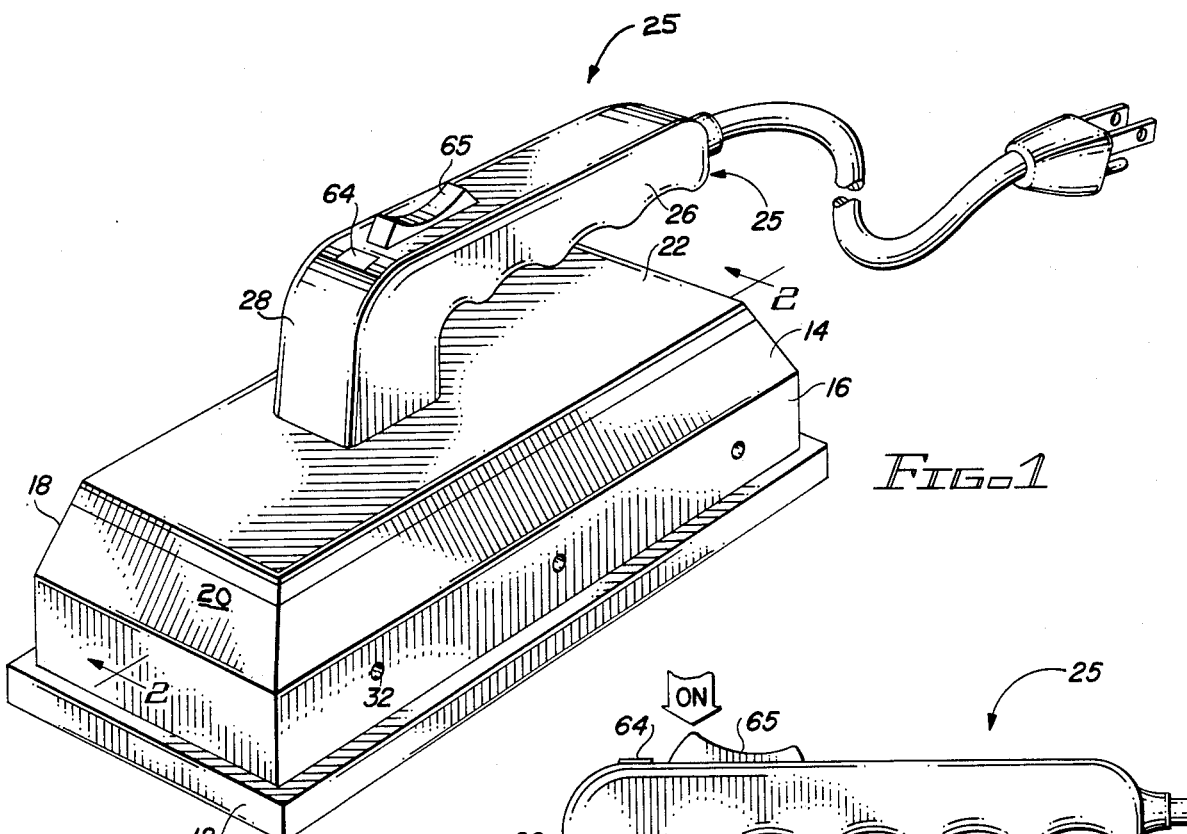
FIG. 1 is a perspective view of the electric iron of the present invention.
Figure 2:
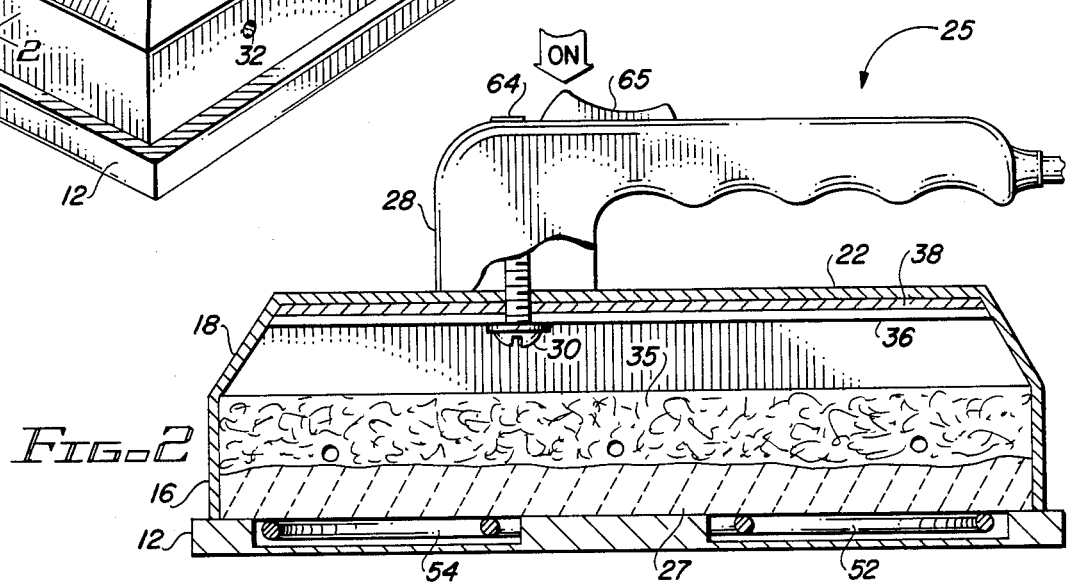
FIG. 2 is a sectional view of the iron of the present invention taken along lines 2—2 of FIG. 1.
Figure 3:
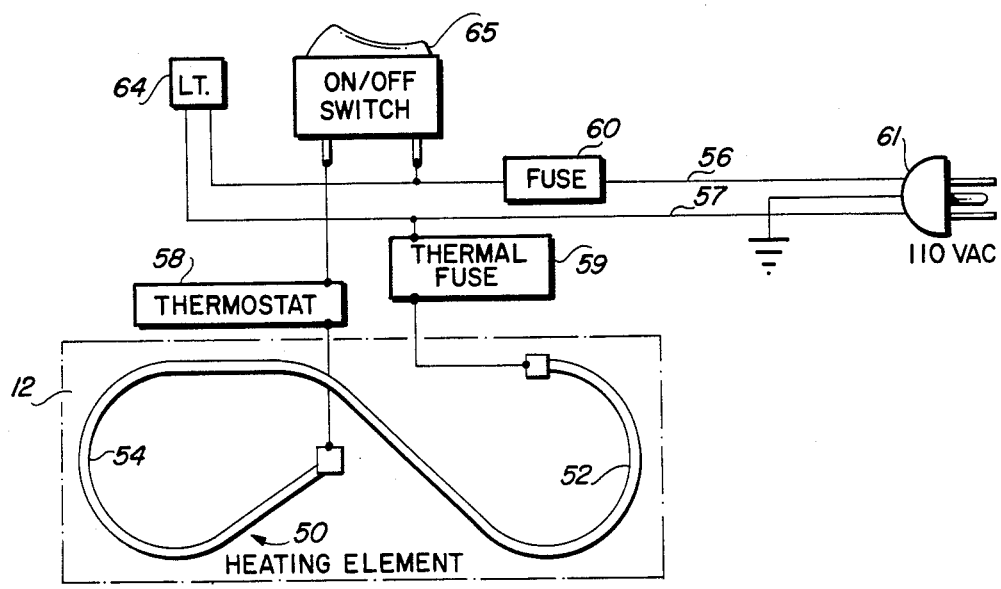
FIG. 3 is a schematic view of the electrical circuit for heating the iron of the present invention.

Turning now to the drawings, FIGS. 1 to 3, an electric iron 10 is illustrated having a gnerally rectangular heating or sole plate 12. Sole plate 12 is preferably a highly conductive heat-resistant material such as aluminum having one or more electrical heating elements contained therein as will be explained in greater detail with reference to FIG. 3. The iron has a body 14 having a lower section 16 which is generally rectangular in cross-section and is positioned on the upper surface of the sole plate. Upper body section 18 is generally trapezoidal in cross-section having side walls 20 which incline upwardly to upper surface 22. Upper surface 22 supports a handle 25 of heat-resistant material with a generally horizontal extending portion 26 which is adapted to be grasped by the user and a pedestal section 28 which is joined to the upper surface 22 of the body by appropriate fasteners 30. Handle portion 26 is shown as having contours or indentations to conform to the hand and fingers of the user.

As pointed out above, one of the problems encountered in the use of heat-sensitive adhesive tape, particularly of the type used for joining fiberglass panels, is that the release of the adhesive requires substantial elevated temperatures not generally attainable with prior art devices. For example, temperatures in excess of 580° F. are generally required for this purpose and prior art irons will often not reach this temperature or, if subjected to elevated temperatures in this range for a period of time, will burn out. The present invention provides a unique design which allows the maintenance of elevated temperatures for substantial periods of time. To this end, lower body section 16 is filled with a refractory insulative material 27. Body section 16 is substantially co-extensive with the sole or heating plate 12 so that the insulation 27 within body section 16 provides a barrier between the sole plate and the hand of the operator and also serves to restrict transfer of heat away from the sole plate 12. With the refractory filler, the heat is maintained at the sole plate for application to the work area. The refractory material 27 may be any suitable material and preferably is a ceramic refractory which may be prepared in liquid form and poured into the body section 16 and thereafter allowed to solidify. One or more vent holes 32 may also be provided in the side walls of the body portion 16. Note the refractory material 27 may only extend to partially fill the lower body section 16 so vent holes 32 may be provided in the area above the upper surface of the refractory filler 27 occupied by dead air.

The upper body section 18 is filled with additional insulation material 35, preferably a spun silicon or spun fiberglass material. A planar fiberglass gasket, 36 extends across the upper surface of insulation 35 and or fiber glass an additional gasket such as a Garlock nonasbestos insulating gasket, 38 may be interposed between the fiberglass gasket 36 and upper surface 22 of the body.

As seen in FIG. 3, the sole plate is heated by a resistance electric heating element 50 having coiled sections 52 and 54 which may be cast within the sole plate or housed with recesses provided in the sole plate 12. The coils extend substantially the full length and width of the plate for uniform heating throughout the plate 12. The coils are connected to a source of electric power by lines 56 and 57 which are connectable to a conventional source of AC power at plug 61. An indicator light 64 is connected to lines 56 and 57 and the indicator light is housed in the handle to give the user an indication of when the switch 65 is moved to an "on" position.

Line 57 is provided with a high limit switch fuse 59 which is temperature sensitive and if temperatures exceeding a predetermined level such as 700° F. are exceeded, the switch will interrupt the circuit. Preferably this fuse is not a re-settable fuse and in the event of high temperatures which indicates a malfunction of the circuit, the unit must be sent to an authorized repair location for inspection and possible repair and replacement of the fuse.

A second fuse 60 is interposed in power line 56 which will interrupt the electrical circuit to prevent shock if the electrical cord is inadvertently burned or cut in the process of using the electric iron.

In use, the iron is simply connected to a source of suitable power and turned on at switch 65. The resistance electric heating element 50 will heat the sole plate to a suitable temperature in excess of 580° F. under control of a thermostat 58 connected between switch 65 and heating element 50 which temperature will melt the adhesive or release the bonding agent on the tape. The heating iron is then passed over the tape and the speed of movement along the tape is controlled by the operator to cause the tape to bond abutting or adjacent panels together through release of the bonding agent.

The electric heating iron of the present invention may be fabricated in various sizes depending on the requirements of the particular installation. For example, for working on conventional flat surfaces, the sole plate may typically be rectangular measuring approximately 10"×3¼". For other applications, as for example use with rigid round fiberglass ducting, a smaller version compatible with curved surfaces may be desirable. In this case, the sole plate may be only approximately 4"×1½".

FIGS. 4 and 5 illustrate an alternate embodiment of the present invention generally designated by the numeral 80. In many installations, space is extremely limited and it is difficult for the installer to reach joints to apply the heating iron to the adhesive tape. The electric iron of embodiment 80 includes a body 82 generally constructed as shown in FIGS. 1 to 3 but having opposed sole plates 84 and 86 attached to an intermediate body 82. The sole plates 84, 86 each define a recess 87 as shown in FIG. 3 which receives a generally S-shaped heating coil 88. Body 82 has refractory liner materials 89 and 89A at adjacent the opposed sole plates within the Body. Interposed between the refractory material is suitable material, such as spun fiberglass or silicon 90. Body section 82 is connected by a universal joint 92 to an elongate handle 94. Power cord 98 extends within the handle having a switch 96 at the distal end. With the power cord connected to a suitable source of power, the elongate handle 94 allows the user to apply heat to the adhesive tape in otherwise hard to reach locations. The sole plates 84 and 86 on opposite sides of the body permit the user to apply heat with either side of the iron giving the operator greater convenience. The universal joint 92 further allows the installer to adjust the position of the iron relative to the handle to accomodate such difficult or hard-to-reach installations by adjustment of the relative angle of the iron to the handle at collar 95.

FIG. 6 shows still another embodiment of the present invention generally designated by the numeral 100. The electric iron of FIG. 6 is constructed generally as shown with reference to FIGS. 1 to 3 having a body 102 secured to a sole plate 104. In this embodiment, the body 102 is constructed in a general V-shape. The sole plate 104 is secured at the interior surface of the body also having two sections 104A and 104B generally angularly disposed with respect to one another. Typically, heating plate sections 104, 104A define a right angle. The body is constructed having a layer of refractory material 105 disposed immediately adjacent the sole plate. The sole plate sections each contain an electric heating element as has been described with reference to FIG. 3 which element is recessed within the sole plate. A space 110 is defined between the housing and the refractory material 105 and one or more gaskets 112, 114, of preferably fiberglass or other insulative non-asbestos material, at the inner side of housing 102. The dead air space 110 may contain spun fiberglass or similar material. A handle 120 extends from a mounting member 112 at the upper surface of the body.

The electric heating iron 100 is designed to apply heat to corners at the juncture of two panels as for example at an interior corner. The heat sensitive tape is applied to the corner and the heated iron is moved along the joint with the opposite sections 104A and 104B of the sole plate 104 engaging opposite sides of the corner to cause the bonding agent to be heated and released.

FIG. 7 shows another embodiment of the present invention basically constructed the same as shown in FIG. 6. The embodiment of FIG. 7 is generally designated by the numeral 150 and is constructed as has been described with reference to FIG. 6 with the exception that the body 135 and sole plates 136, 136A are configured in a V or a vulviform configuration. Preferably the two sole plates 136, 136A are disposed at an angle of approximately 30° to 60° relative to one another each having a recess containing a generally S-shaped heating element, not shown but constructed as shown in FIG. 3. Each sole plate is contained within a body having a layer of refractory material 140 and air space 141 above the sole plate. Vents 142 are provided in the body in the area of the air space 141. Suitable insulative gaskets 143 are interposed between the handle assembly 145 and body 135. Either of the surfaces may be used for heating the adhesive tape and in the case of an exterior joint or juncture of several panels, the angularly disposed faces can be inserted and moved along the joint releasing the adhesive and sealing the joint. In such locations, standard flat iron surfaces do not be usable as interior joints would not permit the insertion of such a device.

It will be obvious to those skilled in the art to make various changes, alterations and modifications to the electric iron of the invention herein. To the extent such changes, alterations and modifications do not depart from the spirit and scope of the appended claims, they are intended to be encompassed therein.

I claim:

1. An electric heating device for heating a heat-sensitive adhesive tape to release the adhesive, said device comprising:
    (a) a sole plate and having a generally planar surface for engaging and heating the tape, said surface having a front and rear edge;
    (b) electrical heating means associated with said sole plate and adapted to heat said plate said heating means including a generally S-shaped resistance heating element disposed in a recess in said sole plate in a generally longitudinally extending orientation with reference to the front and rear edges of the said sole plate having portions of the element extending transversely adjacent the said front and rear edges of the sole plate;
    (c) body means secured over the upper side of said sole plate in substantially coextensive relationship thereto and including a refractory material therein above said sole plate and in contiguous and coextensive relationship thereto to prevent dissipation of heat away from said surface;
    (d) handle means extending from said body means for manually controlling the movement of said device; and
    (e) vent means associated with said body means in the area of said refractory material.

2. The device of claim 1 wherein said sole plate is generally configured in a V-shape for engaging angularly adjacent surfaces.

3. The device of claim 2 wherein said sole plate is V-shaped and adapted to engage outside corners.

4. The device of claim 2 wherein said sole plate is V-shaped and adapted to engage inside corners.

5. The device of claim 1 wherein said handle is elongate and secured to said body at a universal connection.

6. The device of claim 2 wherein said electrical heating means includes thermostatic control means to limit the temperature of said sole plate and further includes fuse means to terminate operation of said electrical heating means in the event of a short circuit.

* * * * *